US012671193B2

(12) United States Patent
Lin et al.

(10) Patent No.: US 12,671,193 B2
(45) Date of Patent: Jun. 30, 2026

(54) SYSTEMS AND METHODS FOR INGRESS SEALING OF ELECTRICAL CONTACTS FOR WEARABLE OR IMPLANTABLE DEVICES

(71) Applicant: Verily Health Inc., Dallas, TX (US)

(72) Inventors: Arthur Lin, Fremont, CA (US); David Lari, San Francisco, CA (US)

(73) Assignee: Verily Health Inc., Dallas, TX (US)

( * ) Notice: Subject to any disclaimer, the term of this patent is extended or adjusted under 35 U.S.C. 154(b) by 268 days.

(21) Appl. No.: 18/148,728

(22) Filed: Dec. 30, 2022

(65) Prior Publication Data

US 2024/0222889 A1 Jul. 4, 2024

(51) Int. Cl.
| | |
|---|---|
| *H01R 12/59* | (2011.01) |
| *H01R 4/04* | (2006.01) |
| *H01R 4/58* | (2006.01) |
| *H01R 13/52* | (2006.01) |
| *H01R 43/00* | (2006.01) |
| *H02J 7/70* | (2026.01) |

(52) U.S. Cl.
CPC ............. *H01R 12/592* (2013.01); *H01R 4/04* (2013.01); *H01R 13/5219* (2013.01); *H01R 43/005* (2013.01); *H02J 7/70* (2026.01); *H01R 4/58* (2013.01); *H01R 2201/12* (2013.01)

(58) Field of Classification Search
None
See application file for complete search history.

(56) References Cited

U.S. PATENT DOCUMENTS

| | | | |
|---|---|---|---|
| 9,511,216 B2 | 12/2016 | Suwito | |
| 2012/0157804 A1* | 6/2012 | Rogers | H01L 24/50 604/20 |
| 2014/0350652 A1* | 11/2014 | Suwito | H01R 13/2414 607/116 |
| 2019/0290921 A1* | 9/2019 | Stevenson | H01G 4/35 |

OTHER PUBLICATIONS

PCT/US2023/085704 , "International Search Report and Written Opinion", Apr. 5, 2024, 13 pages.

* cited by examiner

*Primary Examiner* — Nicholas J Lee
(74) *Attorney, Agent, or Firm* — Kilpatrick Townsend & Stockton LLP

(57) ABSTRACT

Systems and methods for ingress sealing of electrical contacts for wearable or implantable devices are provided herein. An example device may include a housing portion defining a depression having one or more openings. The device may also include one or more electrical contacts configured to provide an electrical pathway between an external surface and an interior surface of the housing portion. The device may include an insulator disposed within the depression, the insulator including one or more apertures configured to receive the electrical contacts. The insulator may electrically isolate the electrical contacts from the housing portion and from each other. The electrical contacts may be each positioned within a respective aperture of the insulator and extend through a respective opening of the openings. The device may include an anisotropic conductive film (ACF) positioned over the electrical contacts to seal the apertures and the openings to prevent ingress of contaminants.

20 Claims, 12 Drawing Sheets

700

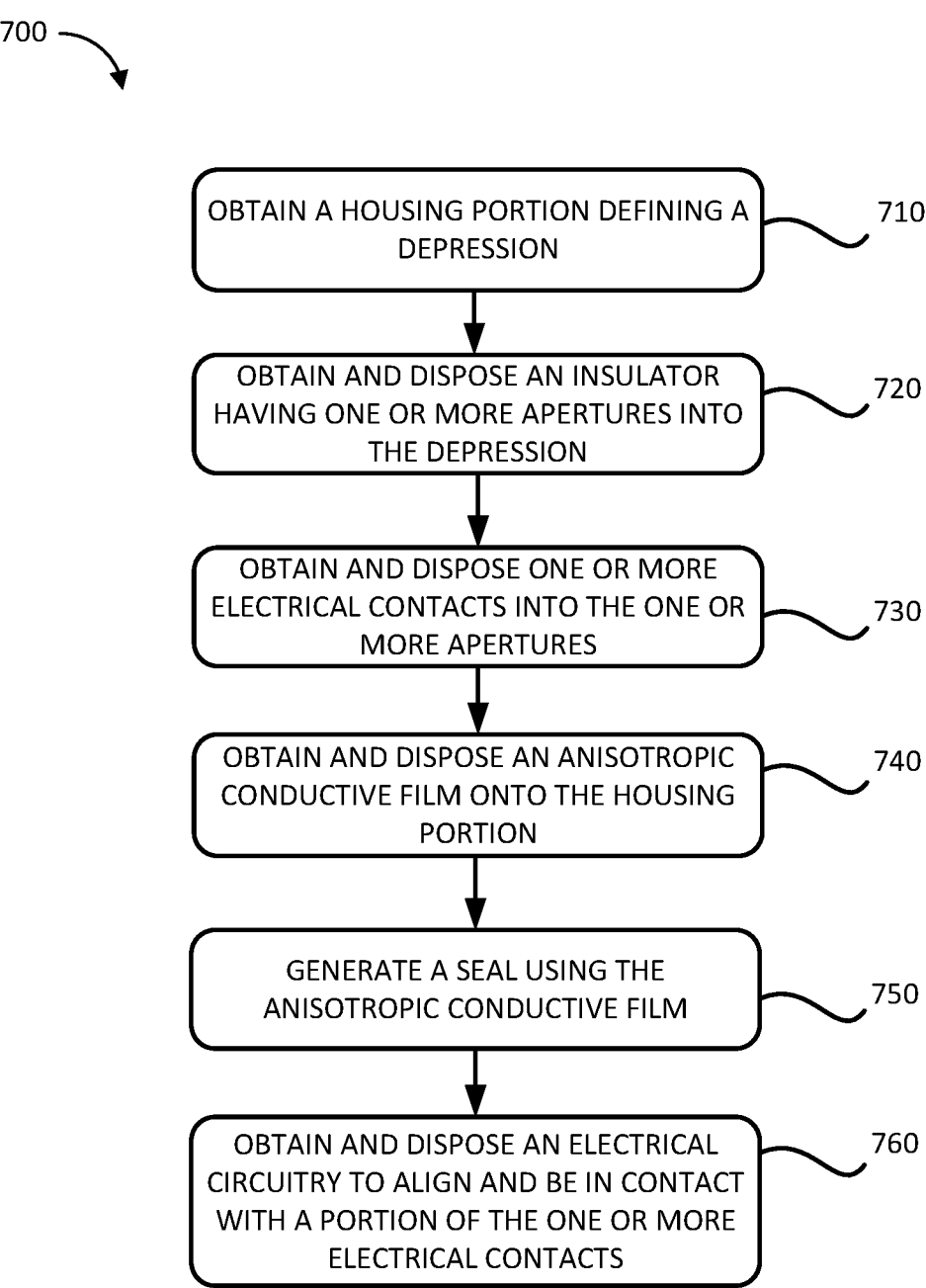

710
OBTAIN A HOUSING PORTION DEFINING A DEPRESSION

720
OBTAIN AND DISPOSE AN INSULATOR HAVING ONE OR MORE APERTURES INTO THE DEPRESSION

730
OBTAIN AND DISPOSE ONE OR MORE ELECTRICAL CONTACTS INTO THE ONE OR MORE APERTURES

740
OBTAIN AND DISPOSE AN ANISOTROPIC CONDUCTIVE FILM ONTO THE HOUSING PORTION

750
GENERATE A SEAL USING THE ANISOTROPIC CONDUCTIVE FILM

760
OBTAIN AND DISPOSE AN ELECTRICAL CIRCUITRY TO ALIGN AND BE IN CONTACT WITH A PORTION OF THE ONE OR MORE ELECTRICAL CONTACTS

*FIG. 7*

SYSTEMS AND METHODS FOR INGRESS SEALING OF ELECTRICAL CONTACTS FOR WEARABLE OR IMPLANTABLE DEVICES

FIELD

The present application generally relates to wearable or implantable devices, and more specifically relates to systems and methods for ingress sealing of electrical contacts for wearable or implantable devices.

BACKGROUND

Wearable electronic devices may be used for a variety of reasons. For example, wristwatches, activity monitors, physiological sensors, etc. may be worn to provide information to the wearer or to sense characteristics of the wearer. Sensed information may be viewed by the wearer or may be transmitted to another device, such as the wearer's smartphone. Further, wearable or implantable electronic devices typically derive power from an on-board battery. Such wearable or implantable electronic devices may be charged wirelessly or by physically connecting electrical contacts to an external charger, i.e., non-wireless charging. Wirelessly charging, however, does not require exposure of electrical contacts through an exterior housing of the wearable or implantable electronic device, which allows the devices to be more easily sealed against contaminants.

SUMMARY

Various examples are described for ingress sealing of electrical contacts for wearable or implantable devices. One example may include a device having a first housing portion. The first housing portion may define a depression having one or more openings. The device may also include one or more electrical contacts configured to provide an electrical pathway between an external surface of the first housing portion and an interior surface of the first housing portion. For example, the one or more electrical contacts may include gold-plated contacts, printed circuit board contacts, or electrical contacts formed as part of electrical circuitry.

The device may also include an insulator disposed within the depression. For example, the insulator may be or include a single molded block of rigid plastic or multiple discrete insulators. The insulator may include one or more apertures configured to receive the one or more electrical contacts, where the insulator electrically isolates the one or more electrical contacts from the housing portion and from each other. The one or more electrical contacts may be each positioned within a respective aperture of the insulator and extend through a respective opening of the one or more openings. In an example embodiment, the one or more electrical contacts may include a plurality of electrical contacts and the one or more apertures may include a plurality of apertures such that each of the plurality of apertures is configured to receive a respective electrical contact from the plurality of electrical contacts.

The device may also include an anisotropic conductive film (ACF). The ACF may be positioned over the one or more electrical contacts to seal the one or more apertures and the one or more openings to prevent ingress of contaminants. In some embodiments, the ACF may provide an electrical pathway between the one or more electrical contacts and one or more electrical contacts of a printed circuit board.

In some embodiments, the device may also include a printed circuit board ("PCB") having electrical circuitry to charge a battery. The printed circuit board may include one or more electrical contacts in electrical communication with the electrical circuitry and one or more of the electrical contacts. For example, the device may include a PCB, a processor disposed on the PCB, and a sensor having an electrode. In such an example, the electrode may include at least one of the one or more electrical contacts, and the ACF may be positioned over and in contact with the electrode of the sensor on a first side of the ACF and in contact with electrical circuitry corresponding to one or more PCB electrical contacts on the PCB on a second side of the ACF. The first side and the second side may be approximately opposing and the ACF may electrically couple the electrode to the one or more PCB electrical contacts of the electrical circuitry.

Optionally, the device may include a heat activated film. The heat activated film may be positioned over and in contact with the insulator to form a seal between the insulator and the first housing portion. In an example embodiment, the device may include an electrical circuitry configured to electrically couple to a battery housed within the first housing portion with an external charging device. The device may also include a stiffener disposed within the housing over the insulator and the electrical contacts.

In another aspect, a method of sealing a wearable device is provided. The method may include providing a first housing portion defining a depression having one or more openings and disposing an insulator having one or more apertures formed therein into the depression of the first housing portion. The depression may be configured to receive the insulator. The method may also include disposing one or more electrical contacts into the one or more apertures of the insulator. The one or more apertures may be configured to receive the one or more electrical contacts such that at least a portion of each of the one or more electrical contacts is exposed to an external environment via the one or more openings of the depression. The insulator may electrically isolate the one or more electrical contacts from the first housing portion and from each other.

The method may also include disposing an anisotropic conductive film (ACF) onto the first housing portion and generating a seal using the ACF. The ACF may be configured to be electrically conductive along a thickness of the ACF. In some embodiments, disposing the ACF onto the first housing portion may include disposing the ACF to be in contact with the insulator and generating the seal using the ACF may include forming a seal between the insulator and the electrical circuitry. Generating the seal using the ACF may include performing one or more sealing processes to the ACF to create the seal. For example, the one or more sealing processes may include at least one of a heat-application process, a pressure-application process, or a curing process. In an example where the sealing process involves a heat-application process, the method may include performing the heat-application process. Performing the heat-application process may include applying an increased temperature to the ACF for at least 10 seconds.

The method may also include disposing an electrical circuitry to align with and be in contact with at least a portion of each of the electrical contacts. The seal formed by the ACF may be between the first housing portion and the electrical circuitry. In some embodiments, the first housing portion may include a central opening. In such cases, the method may also include inserting a sensor having an electrode into the central opening of the first housing portion and applying the ACF onto the electrode to be in contact with at least a portion of the electrode. The ACF may provide an electrical pathway between the electrode and the electrical circuitry. In some embodiments, the ACF may include a first ACF and a second ACF. In such cases, the first ACF may form a seal between the first housing portion and the electrical circuitry and the second ACF may provide the electrical pathway between the electrode and the electrical circuitry. Optionally, the method may include forming the one or more electrical contacts as part of the electrical circuitry.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 7 shows an example method for sealing wearable or implantable electronic devices; according to an embodiment herein.

DETAILED DESCRIPTION

Figures 1A, 1B:
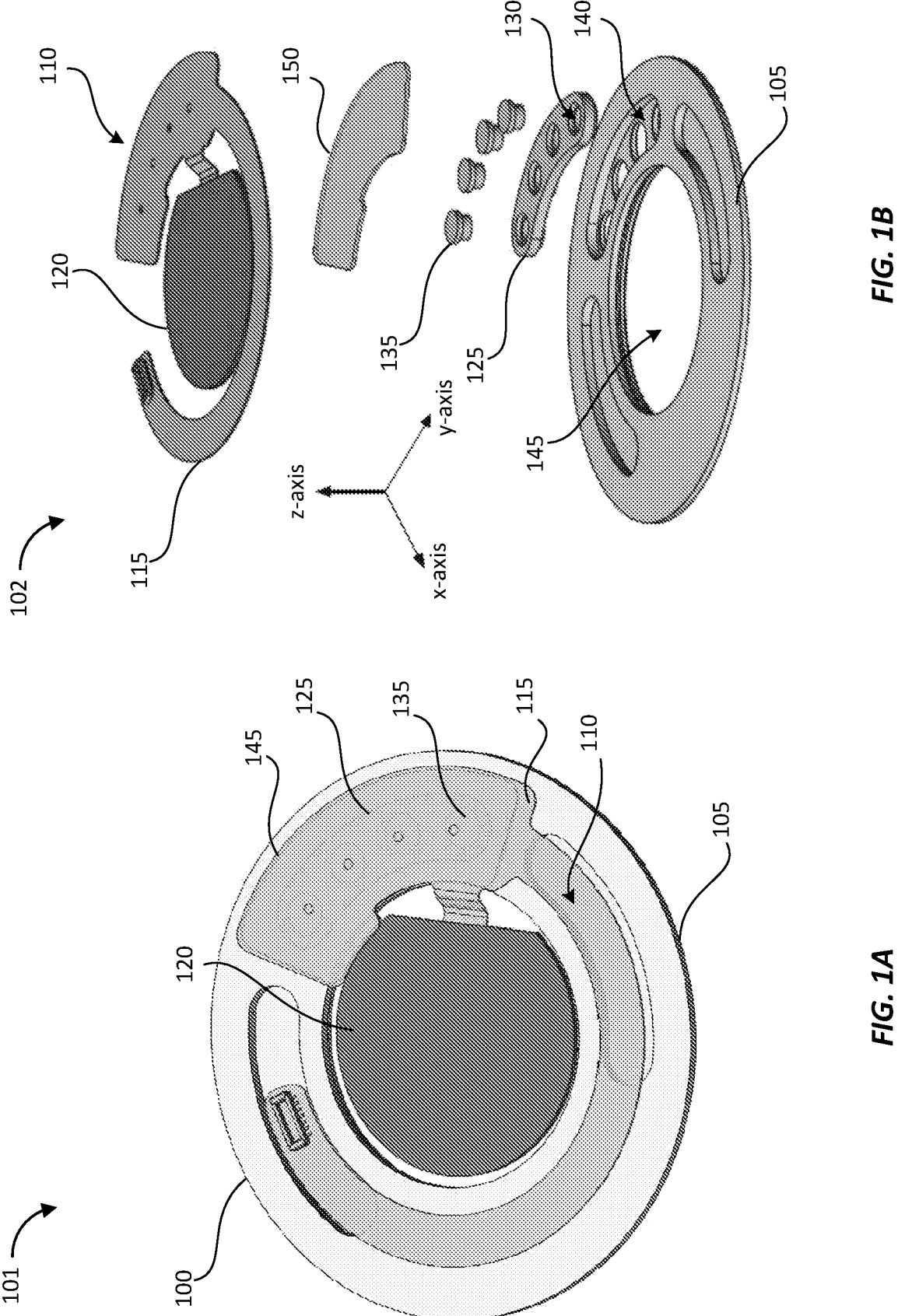
FIGS. 1A-1C show an example charging system for a wearable electronic device, according to an embodiment provided herein.

Examples are described herein in the context of systems and methods for ingress sealing of electrical contacts for wearable or implantable devices. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Some electronic devices may be worn against the user's skin or on the user's body and may be subjected to many different types of materials that may damage or destroy sensitive electronics within the wearable device. Because wearable devices may have a relatively long useful life, e.g., multiple years, it is likely that the device will encounter many different environments, including high-moisture environments. In addition, the user may occasionally clean the device, which may include rinsing the device under a faucet or wearing it into the shower or a bath. Thus, these devices may be sealed during assembly to prevent ingress of such materials, notably moisture.

An illustrative example of such a device has two halves of a mechanical housing that contain and protect the device's electronics. The two halves of the housing are pressed together and sealed during manufacture to protect the electronics. The seal in this example is a gasket that matches the perimeters of the two halves of the housing and sits between the two housing halves when they are fastened together, such as using screws or a pressure-sensitive adhesive ("PSA"). During this process, the gasket is compressed between the two housing halves and seals the assembled housing. This example wearable device, however, may not be capable of wireless charging and instead include one or more ports to enable cables or wires to be connected to the wearable device.

To allow for non-wireless charging of a wearable device, the electrical contacts of the device may be exposed through the exterior housing. This generally means that the electrical contacts are environmentally exposed, unless properly sealed. Since wearable devices, as noted above, are often exposed to moisture-containing environments, preventing ingress of materials, such as moisture, around the electrical contacts is desirable.

Electrical contacts are conductive, and thus require electrical isolation from one another during charging of the wearable device. Additionally, if any of the additional components of the wearable device, such as a housing piece, are also made from metal, then the electrical contacts also need to be electrically isolated from those components as well.

These illustrative examples are given to introduce the reader to the general subject matter discussed herein and the disclosure is not limited to this example. The following sections describe various additional non-limiting examples and examples of systems and methods for ingress sealing of electrical contacts for wearable or implantable devices.

Figure 1C:
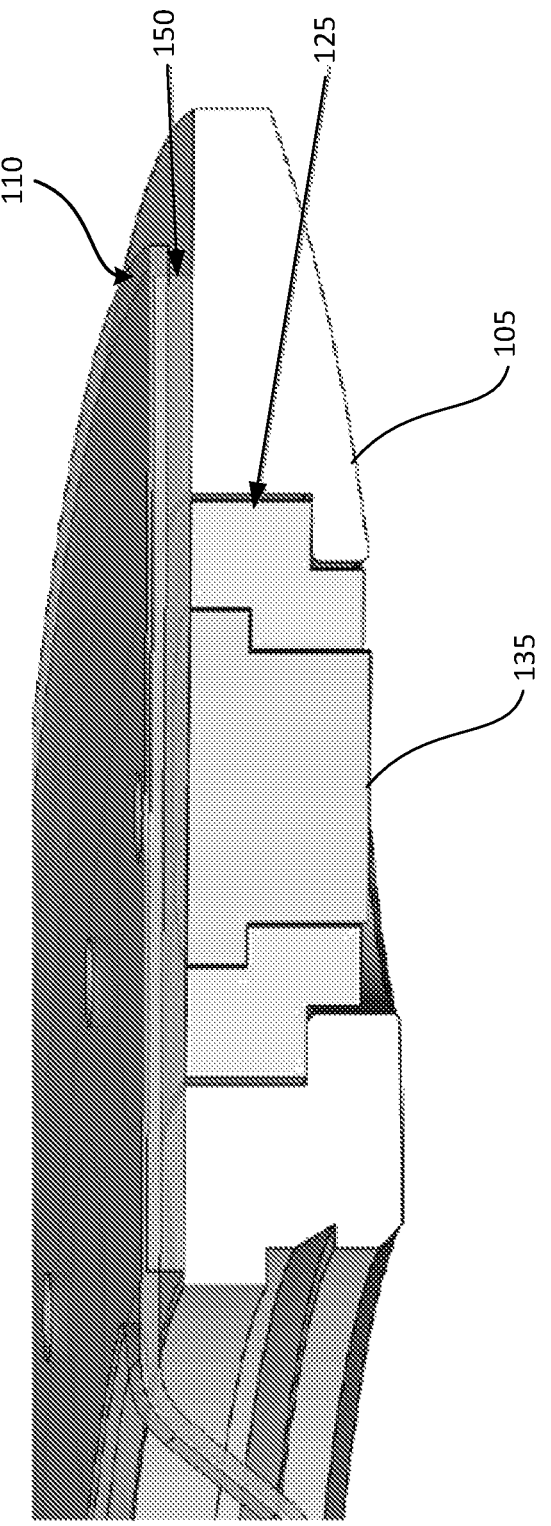

Referring now to FIGS. 1A-1C, FIGS. 1A-1C show an example charging system portion ("charging system") 100 for a wearable electronic device. For example, FIGS. 1A-1C may illustrate a charging system 100 that maybe housed in a bottom portion of a wearable electronic device, which may be the portion of the housing worn against the wearer's skin. FIG. 1A illustrates a compiled or assembled view 101 of the charging system 100, FIG. 1B provides an exploded view 102 of the charging system 100, and FIG. 1C provides a cross-sectional view 103 of the charging system 100 as assembled.

As noted above, the charging system 100 may be part of a wearable or implantable electronic device and be used to provide electrical connections to charge the device. The device may be any suitable electronic device and may provide any of a variety of functionalities to the user. For example, the device in this example may be or be part of various types of wearable devices or implantable devices. Depending on the functionality of the device, the device may include sensors, such as pulse monitors, accelerometers, electrocardiogram electrodes, etc., or may be user devices such as a smartwatch, a personal communication device (e.g., an emergency communications device for elderly users), headphones, earbuds, etc.

Because the device is intended to be worn by a user and to be used over an extended period of time, e.g., weeks, months, or years, it will be subjected to various environmental conditions that might damage the electronic components within the device, such as moisture or running water. To prevent such damage, the device is sealed to prevent moisture ingress.

As illustrated, the charging system 100 of the device may include a housing portion 105. The housing portion 105 may be part of an external housing of the device. For example, the housing portion 105 may be a bottom housing portion of the device. The housing portion 105 may be metal, such as stainless steel. As illustrated by exploded view 102, the housing portion 105 may include an opening 145. The opening 145 may be configured to receive a glass or plastic piece to allow for use of a sensor, such as an electrocardiogram ("ECG" or "EKG") sensor or photoplethysmogram ("PPG"). In other embodiments, a component may be received into the opening 145 for aesthetic purposes. In still further embodiments, the housing portion 105 may not include the opening 145 and the housing portion 105 may instead be a solid component.

The device may not be wirelessly chargeable, thus it may have exposed contacts to allow charging. To allow for non-wireless charging, the charging system 100 may include one or more electrical contacts 135. The electrical contacts 135 may be configured to contact pins from an external charging device (not shown). Upon contact between the electrical contacts 135 and the contact pins, power may be supplied to charge the wearable device. The electrical contacts 135 may be formed from any electrically conductive material, such as for example, stainless steel; (e.g., 316L SS), brass, gold, or copper. In an illustrative example, the electrical contacts 135 may be gold-plated contacts or formed via a screw machining process.

While the following discussion relates to using the electrical contacts 135 for charging purposes, it should be appreciated that in some embodiments, the electrical contacts 135 may be used for purposes outside of charging. For example, electrical contacts 135 may be used as an electrode, for sensing purposes, as contacts for a USB connection, or other communications connections.

To charge a battery (not shown) within the device, the electrical contacts 135 may be electrically coupled to electrical circuitry 110. The electrical circuitry 110 may include an electrical pathway component 115 and a printed circuit board (PCB) 120. In some embodiments, the PCB 120 may be a flexible printed circuit (FPB) and the electrical pathway component 115 may be a flex circuit. The PCB 120 may include relevant electronics for the device, such as a processor (e.g., a microcontroller), an RF transceiver, or one or more electrical connectors, depending on the application of the device. The PCB 120 may also be connected to a secondary or main PCB elsewhere in the device with additional electrical components. The electrical circuitry 110 may be configured to be electrically coupled with a battery (not shown) housed within the wearable device.

Because the electrical contacts 135 are conductive and the housing portion 105 is also conductive in this embodiment, the electrical contacts 135 need to be electrically isolated from the housing portion 105. To electrically isolate the electrical contacts 135 from the housing portion 105, the device may include an insulator 125. The insulator 125 may be configured to electrically isolate the electrical contacts 135 from the housing portion 105 as well as the neighboring electrical contacts 135. For example, as illustrated, the insulator 125 may include one or more apertures 130. Each of the apertures 130 may be configured to receive and hold a charging contact 135. As illustrated by the assembled view 101, each of the electrical contacts 135 may be received by an aperture 130. For example, the electrical contacts 135 may be slip or press fit into a respective aperture 130.

The insulator 125 may be or include an insulating material, such as plastic. For ease of production, the insulator 125 may be composed of a single block of material. For example, the insulator 125 may be a single molded block of rigid plastic. While in other embodiments, the insulator 125 may include more than one component. For example, each of the electrical contacts 135 may have a respective insulator 125 or an insulator 125 may be configured to receive only one or two electrical contacts 135. As should be appreciated, the configuration of the insulator 125 may depend on the application and configuration of the charging system 100. However, as noted above, forming the insulator 125 from a single block of material may be advantageous to reduce production time, assembly time, and cost.

The insulator 125 may be composed of material having additional properties beyond an insulating property. For example, the insulator 125 may be composed of a material having a heat resistant property. For example, the insulator 125 may be or contain performance thermoplastic resins, such as a ULTEM® polyetherimide (PEI) thermoplastic, or a polyphenylsufone (PPSU) thermoplastic material, such as a Radel® thermoplastic. The heat resistance properties may be advantageous to prevent the insulator from melting when subject to elevated temperature during assembly, such as soldering or heat pressing, for example.

In some embodiments, the housing portion 105 may include a depression 140 for receiving the insulator 125. The depression 140 may be configured to receive the insulator 125 such that the insulator 125 can electrically isolate the electrical contacts 135 from the housing portion 105. The depression 140 may also be configured to allow the electrical contacts 135, when positioned within the apertures 130, to extend through the housing portion 105 such to be exposed to an external environment. As noted above, during charging of the device, the electrical contacts 135 may contact pins from a charging device and thus exposure of at least a portion of the electrical contacts 135 to an environment external to the housing portion 105 may be required for non-wireless charging.

As can be appreciated, if a portion of the electrical contacts 135 is exposed to the external environment, then the charging system 100 may be at risk for ingress of materials from the external environment, such as moisture. Conventionally, a seal around the electrical contacts 135 may be formed by insert molding or using an adhesive (either liquid or pressure sensitive adhesive). These conventional seals, however, tend to be time consuming to install or costly (e.g., requiring an extra step such as insert molding into the housing portion 105) or messy (e.g., liquid glue or adhesive). For example, using an adhesive can cause excess adhesive material to be present within the charging system 100, and can impact performance if the excess adhesive material interferes with any of the components therein or with connecting to the external charger. Moreover, conventional forms of sealing charging systems often do not provide a complete or adequate seal. For example, it is common for an additional seal to be required (e.g., additional glue or film adhesive) to be applied on top of an initial seal (e.g., an injection molded seal).

To provide an improved seal for the charging system 100, in particular the electrical contacts 135 against ingress of undesirable materials, the charging system 100 may include an anisotropic conductive film (ACF) 150. The ACF 150 may allow for conduction of electricity in an anisotropic manner. That is, the ACF 150 may only allow for electrical conduction through the thickness of the ACF 150. For example, the ACF 150 may allow for electricity to flow in the z-direction, however, the ACF 150 may prevent the flow of electricity in the x- and y-direction. In other words, the ACF 150 may create an electrical path between the electrical contacts 135 and the electrical circuitry 110 along the z-direction but prevent electrical conductivity between the electrical contacts 135 in the x- and y-direction. In this manner, the ACF 150 can prevent shorting between the electrical contacts 135 while still allowing the electrical contacts 135 to be electrically coupled to the electrical circuitry 110 during charging.

In addition to providing an electrical connection between the electrical contacts 135 and the electrical circuitry 110, the ACF 150 may provide a seal around the electrical contacts 135. For example, when assembled, the ACF 150 may be applied over top the electrical contacts 135 when received into the apertures 130 of the insulator 125. As such, the ACF 150 may form a seal around each one of the electrical contacts 135. Each seal may be formed between the ACF 150 and the insulator 125. In some embodiments, the ACF 150 may also create a seal around a perimeter of the insulator 125. For example, as illustrated by the assembly view 101 of the charging system 100, the ACF 150 may extend beyond the insulator 125 when applied and contact a portion of the housing portion 105 on a first side and the electrical circuitry 110 on a second, opposing side.

In some embodiments, the ACF 150 may be applied to form the seal around the electrical contacts 135 via a sealing process. In some embodiments, the sealing process may include a heat-sealing process. For example, the electrical contacts 135 may be inserted into the apertures 130 and the insulator 125 may be inserted into the depression 140 of the housing portion 105. The ACF 150 may then be applied over the electrical contacts 135, as illustrated by the assembled view 101, and heat may be applied to the ACF 150. Upon application of heat, the ACF 150 may adhere to the housing portion 105 and the insulator 125. To form an adequate seal, the heat applied to the ACF 150 may be at an increased temperature of at least 60° C. For example, a heat application process may have an increased temperature ranging from 60-200° C., 80-200° C., 100-175° C., or 100-125° C.

In other embodiments, the ACF 150 may form a seal using other sealing processes. For example, an ultraviolet (UV) curing method may be used to form a seal using the ACF 150. In other embodiments, a pressure application method may be used in which the ACF 150 is applied over the electrical contacts 135, as described above, and then pressure is applied to the ACF 150 to generate a seal. The various sealing processes are described in greater detail below with respect to FIG. 7.

The ACF 150 may be formed from an adhesive resin having fine conductive fillers dispersed therein. For example, the adhesive resin may be a blend of an epoxy and an acrylate material. The fine conductive fillers may be metal particles or metal-coated particles, such as silver-coated glass beads or metal-coated polymer beads. As will be appreciated, the material used to form the ACF 150 may vary depending on the application requirements, mechanical requirements (e.g., mechanical adhesion), or electrical requirements (e.g., current or load requirements) of the ACF 150. For example, if the charging system 100 is part of a wearable device for deep water swimming, then an ACF 150 with increased mechanical adhesion properties may be desirable to form a seal having enhanced adhesion properties to prevent ingress of water at varying water depths. In another example, if the charging system 100 is part of a wearable device requiring increased charging capabilities, then the ACF 150 with enhanced conductivity properties may be desirable to allow for high current transfer between the electrical contacts 135 and the electrical circuitry 110.

Referring now to FIG. 1C, a cross-sectional view 103 is provided to illustrate a seal formed by the ACF 150 within the charging system 100. When applied and subjected to sealing process, the ACF 150 forms a seal between the electrical circuitry 110 and the housing portion 105. In the illustrated example, the ACF 150 may also form a seal between the electrical circuitry 110 and the insulator 125. As will be described in greater detail in the following Figures, a footprint of the ACF 150 may vary depending on the application. In other words, the extent over which the ACF 150 is applied and contacts components within the charging system 100 may vary depending on the application. Depending on the footprint of the ACF 150, a seal formed by the ACF 150 may be formed between various components within the electrical circuitry 110. Since the ACF 150 is anisotropic (e.g., allows for conduction in single direction), changing of the footprint of the ACF 150, and thereby the seal, can also impact the conduction of electricity through the charging system 100. It should be appreciated that in some embodiments an isotropically conductive film may be used in place of or in addition to the ACF 150. In such cases, the isotropically conductive film may be in the form of multiple islands if covering more than one contact 135.

Figure 2A:
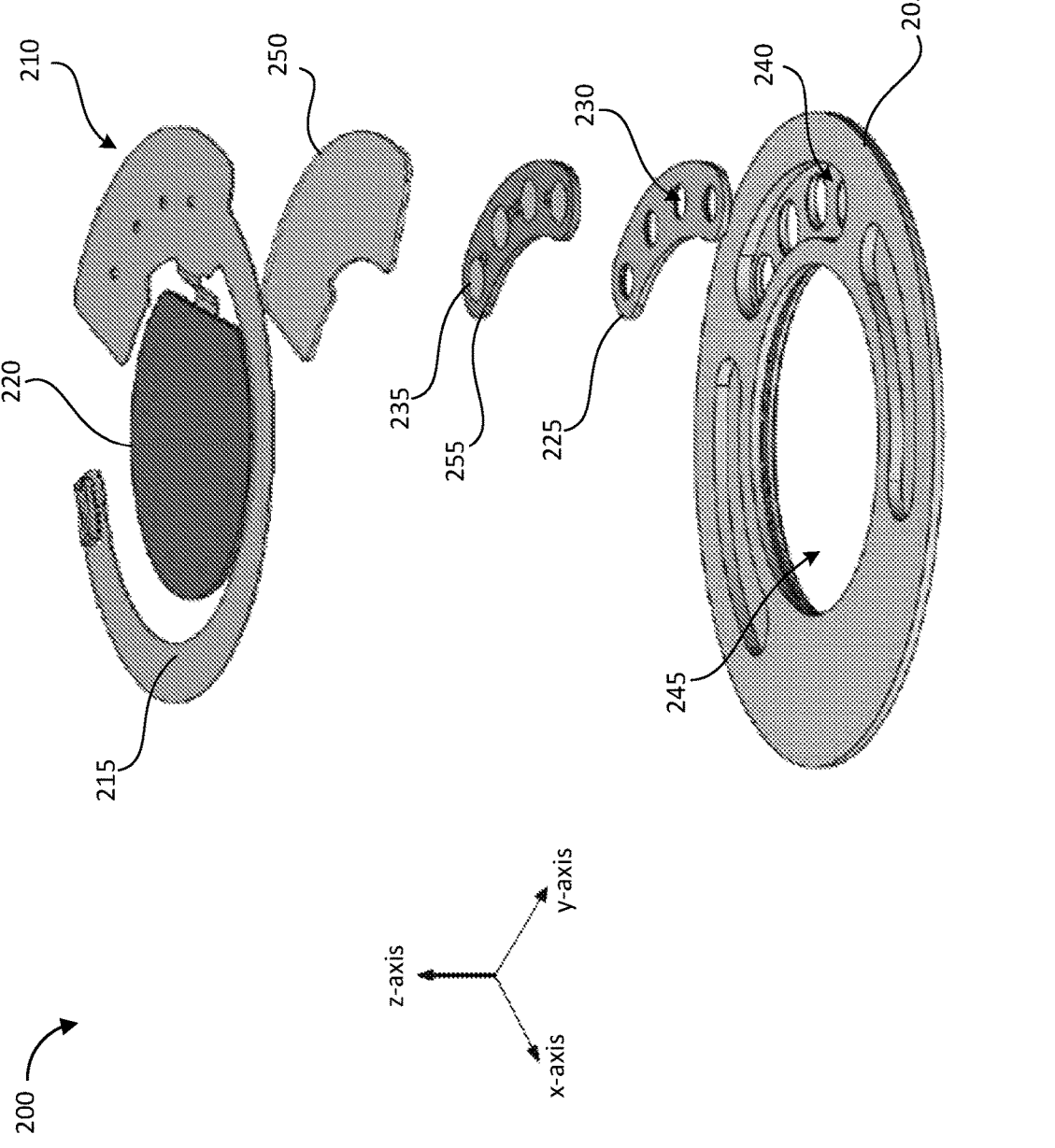
FIGS. 2A-2D show another embodiment of an example charging system for a wearable electronic device, according to an embodiment provided herein.
Figures 2B, 2C, 2D:
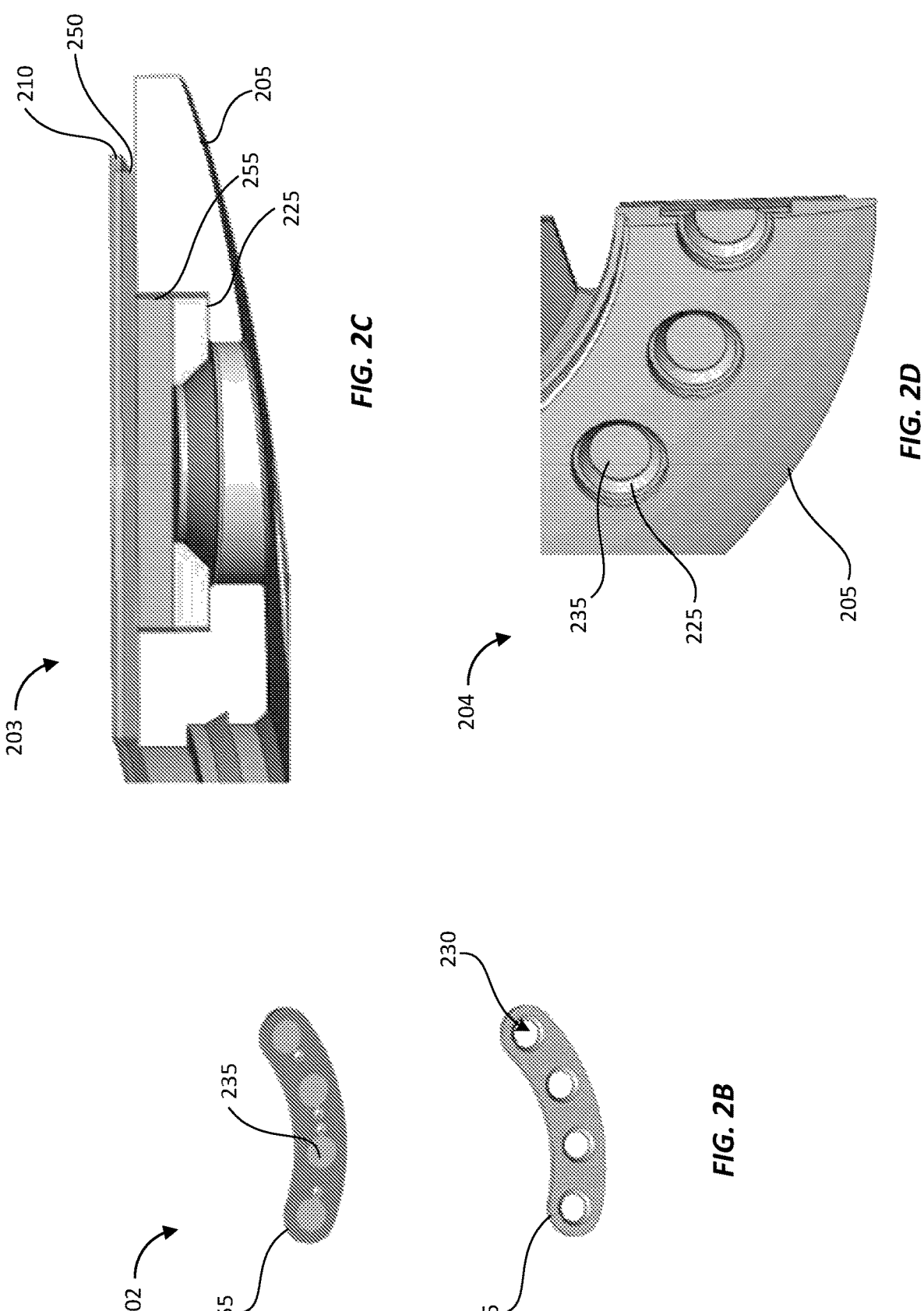

Referring now to FIGS. 2A-2D, FIGS. 2A-2D show another embodiment of an example charging system 200 for a wearable electronic device. According to the embodiment illustrated in FIGS. 2A-2D, the electrical contacts of the charging system 100 may be part of a single contacts component 255, instead of being individual machined contacts, as illustrated in FIGS. 1A-C. FIG. 2A illustrates an exploded view of the charging system 200 including the contacts component 255, FIG. 2B provides a view 202 of the contacts component 255, FIG. 2C provides a cross-sectional view 203 of the charging system 200 as assembled including the contacts component 255, and FIG. 2D provides a bottom-up view 204 of the charging system 200 as assembled including the contacts component 255.

Similar to the charging system 100 illustrated with respect to FIGS. 1A-1C, the charging system 200 may include a housing portion 205. The housing portion 205 may be a bottom portion of a device, such as the external housing of a wearable or implantable device. The housing portion 205 may include an opening 245 and a depression 240. The charging system 200 may also include electrical circuitry 210, including an electrical pathway component 215 and a PCB 120.

The charging system 200 may also include an insulator 225 and one or more electrical contacts 235. The electrical contacts 235, however, may be part of a contacts component 255, instead of being discrete electrical contacts as illustrated in FIGS. 1A-C. As can be seen by the view 202, the electrical contacts 235 may be formed as part of the contacts component 255. For example, the contacts component 255 may be PCB or flex having the electrical contacts 235 formed therein. Forming the electrical contacts 235 as part of the contacts component 255 may be more cost effective than forming individual electrical contacts 135. Moreover, from an assembly and production time standpoint, forming the electrical contacts 235 as part of the contacts component 255 may be advantageous due to ease of assembly and one less production step required.

When the electrical contacts 235 are formed as part of the contacts component 255, the electrical contacts 235 may be or include copper, aluminum, tin, gold, or other metals used in standard PCB or flex circuitry fabrication. Depending on the application, conductivity requirements, biocompatibility requirements, adhesion requirements, etc., the material used to form the electrical contacts 235 may vary. For example, gold and nickel plating on top of copper is often used to provide protection from corrosion.

To provide an electrical pathway from an external charging device (not shown) to the electrical circuitry 210, the insulator 225 may include apertures 230 through which the electrical contacts 235 may be externally accessed. As illustrated by the bottom-up view 204, when the charging system 200 is assembled, the apertures 230 may expose the electrical contacts 235 through the housing portion 205. To charge the device, pins from an external charging device may contact the electrical contacts 235 via the apertures 230 as illustrated in FIG. 2D.

The charging system 200 may also include an ACF 250. The ACF 250 may form a seal and mechanical connection between the electrical circuitry 210 and the housing portion 205. In some embodiments, as illustrated by the assembled view 203, the ACF 250 may form a seal between the electrical circuitry 210 and the contacts component 255.

As noted above, the ACF 250 may form a seal between various components, depending on the footprint of the ACF 250. In some embodiments, the ACF 250 may only form a seal between the electrical circuitry 210 and the housing portion 205; while in other embodiments, the ACF 250 may form a seal between the electrical circuitry 210 and other components of the charging system 200, such as the contacts component 255.

Figures 3A, 3B:
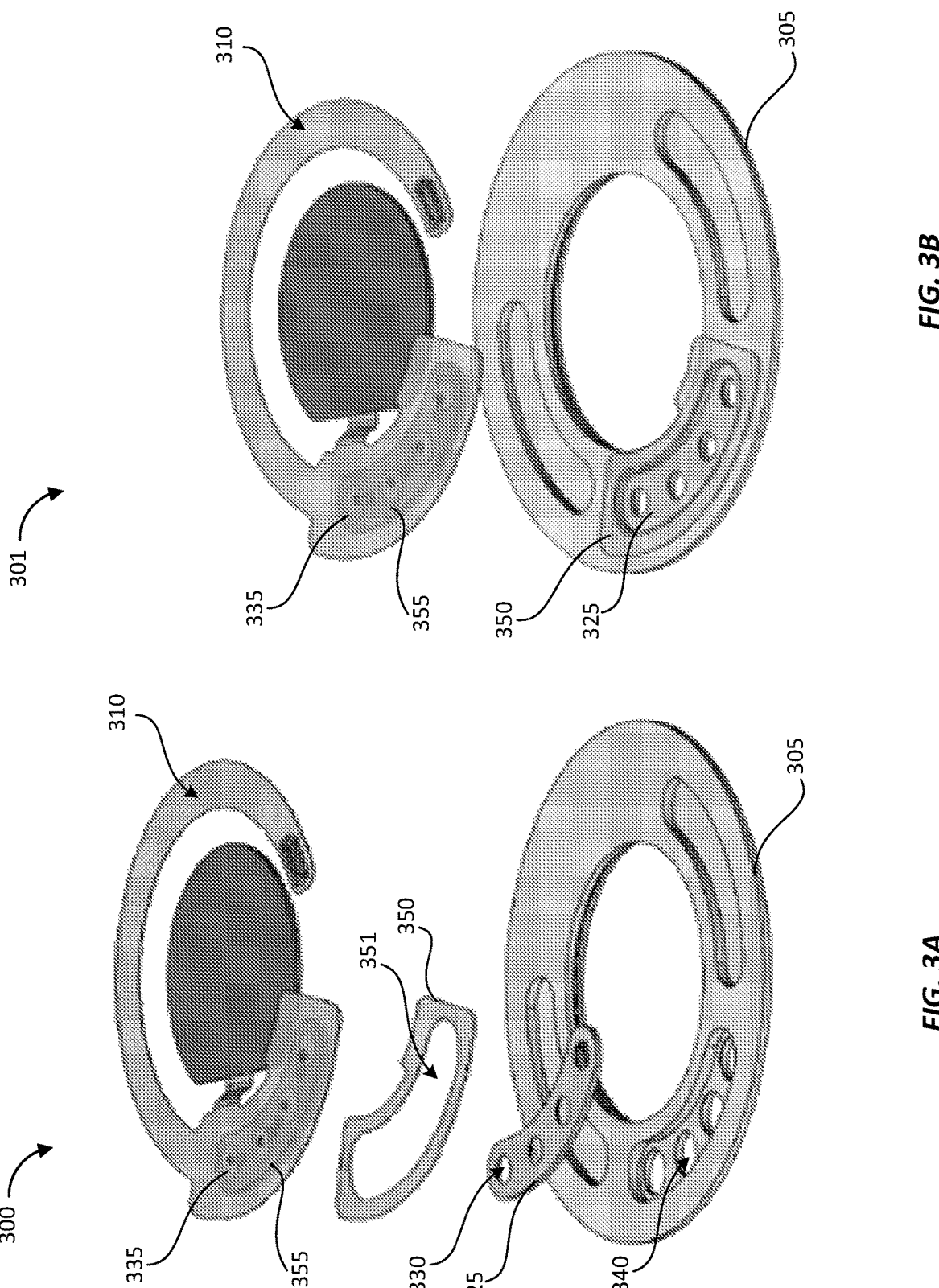
FIGS. 3A-3E show an example charging system including an anisotropic conductive film or heat active film forming a seal between electrical circuitry and a housing portion, according to an embodiment provided herein.
Figures 3C, 3D, 3E:
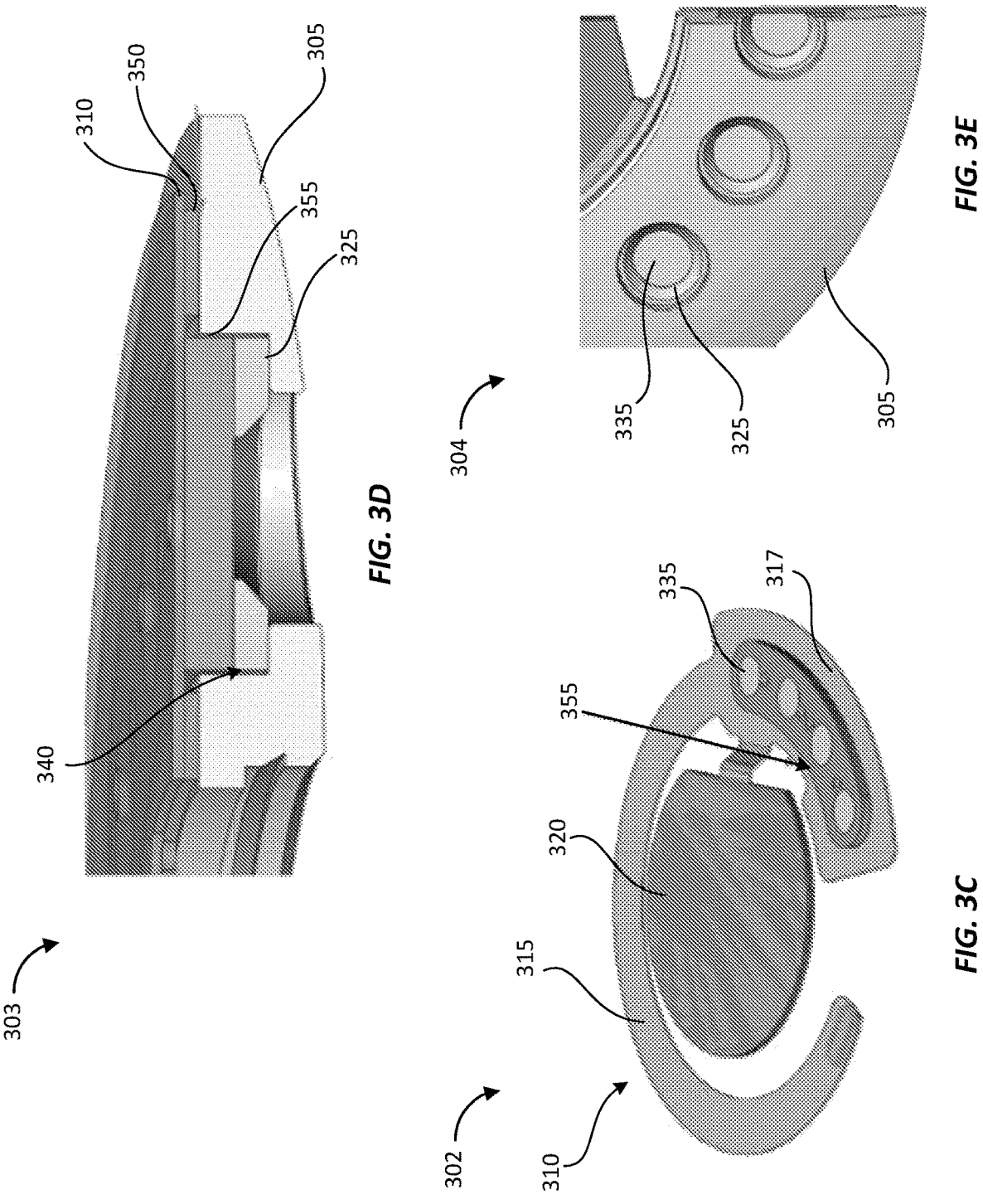

Turning now to FIGS. 3A-3E, a charging system 300 including an ACF or heat activated film (HAF) 350 for forming a seal between an electrical circuitry 310 and housing portion 305 is provided. While the following discussion is with respect to ACF 350, it should be appreciated that the same description can apply to an HAF 350. FIG. 3A provides an exploded view of the charging system 300, FIG. 3B provides a semi-assembled view 301 of the charging system 300, FIG. 3C provides a view 302 of the electrical circuitry 310, FIG. 3D provides a cross-sectional view 303 of the charging system 300 as assembled, and FIG. 3E provides a bottom-up view 304 of the charging system 300 as assembled.

As illustrated, the charging system 300 may be similar to the charging systems 100 and 200. For example, the charging system 300 may include a housing portion 305 having a depression 340. The depression 340 may be configured to receive an insulator 325. The insulator 325 may include one or more apertures 330 for receiving one or more electrical contacts 335. The charging system 300 may also include an electrical circuitry 310. The electrical circuitry 310 may be the same or similar to the electrical circuitry 110 or 210. For example, the electrical circuitry 310 may include an electrical pathway component 315 and a PCB 320.

The electrical contacts 335 may be part of a contacts component 355. The contacts component 355 may be similar to the contacts component 255 except that the contacts component 355 may be part of the electrical circuitry 310.

For example, the contacts component 355 may be formed as part of the electrical circuitry 310. As illustrated by view 302 of FIG. 3C, the contacts component 355 may be formed on the electrical pathway component 315 of the electrical circuitry 310. In some embodiments, the contacts component 355 may be formed via a separate step and then adhered or affixed to the electrical circuitry 310 through a means such as soldering to provide electrical conductivity and mechanical security.

In some embodiments, the one or more electrical contacts 335 may be formed as part of the electrical circuitry 310. Some such embodiments are described in greater detail below with respect to FIGS. 4A-4E. When the one or more electrical contacts 335 are formed as part of the electrical circuitry 310, the contacts component 355 may be formed around the electrical contacts 335. For example, the contacts component 355 may be insert-molded around the electrical contacts 355 such as to affix to the electrical circuitry 310 and form around the electrical contacts 335.

The electrical contacts 335 may be formed on a housing-facing side 317 of the electrical circuitry 310. For example, the electrical contacts 335 may be formed such that when the charging system 300 is assembled, the contacts component 355, along with the electrical contacts 335 insert into the depression 340 of the housing portion 305. As illustrated by the bottom-up view 304, the depression 340 may expose a portion of the electrical contacts 335 through the housing portion 305 to an external environment. When assembled, the insulator 325 may form a seal between the electrical contacts 335 and the housing portion 305, to further prevent ingress of external materials into the charging system 300.

The charging system 300 may also include the ACF 350 for forming a seal to prevent ingress of materials around the electrical contacts 335. As illustrated by FIG. 3A, the ACF 350 according to the illustrated embodiment, may have a smaller footprint that the ACF 250. For example, the ACF 350 may be configured to have an opening 351. The opening 351 may be configured such that when the ACF 350 is applied over the insulator 325, the ACF 350 only contacts the housing portion 305, as illustrated by the semi-assembled view 301 of FIG. 3B. The cross-sectional view 303 of FIG. 3C also illustrates that the ACF 350, when applied, may only contact the housing portion 305 on a first side and the electrical circuitry 310 on a second side. The first and second side being opposite and opposing each other. That is, the opening 351 may be configured such that the contacts component 355 is in contact with the electrical circuitry 310, while the ACF 350 forms a seal between the housing portion 305 and the electrical circuitry 310.

With reference to the cross-sectional view 303, the depression 340, in the illustrated embodiment, may be formed such that the contacts component 355 inserts into the depression 340 to contact the insulator 325. As illustrated by the view 301, during assembly of the charging system 300, the insulator 325 may be inserted into the depression 340 prior to application of the ACF 350. After the ACF 350 is applied onto the housing portion 305, and, in some embodiments, subjected to one or more sealing processes, the contacts component 355 may be positioned to insert into a portion of the depression 340. When the contacts component 355 is inserted into the depression 340, the electrical contacts 335 may be aligned with the one or more apertures 330 of the insulator 325 such to be exposed through the housing portion 305, as illustrated by FIG. 3E. Additionally, the contacts component 355 may be in contact with the insulator 325, such to form a compression seal between the contacts component 355 and the insulator 325.

In addition to aligning the electrical contacts 335 with the apertures 330 during assembly, the electrical circuitry 310 may also be aligned such that the ACF 350 forms a seal between the housing portion 305 and the electrical circuitry 310. In other words, the ACF 350 may form a seal around a perimeter of the insulator 325 between the electrical circuitry 310 and the housing portion 305, thereby preventing ingress of materials.

Figures 4A, 4B, 4C:
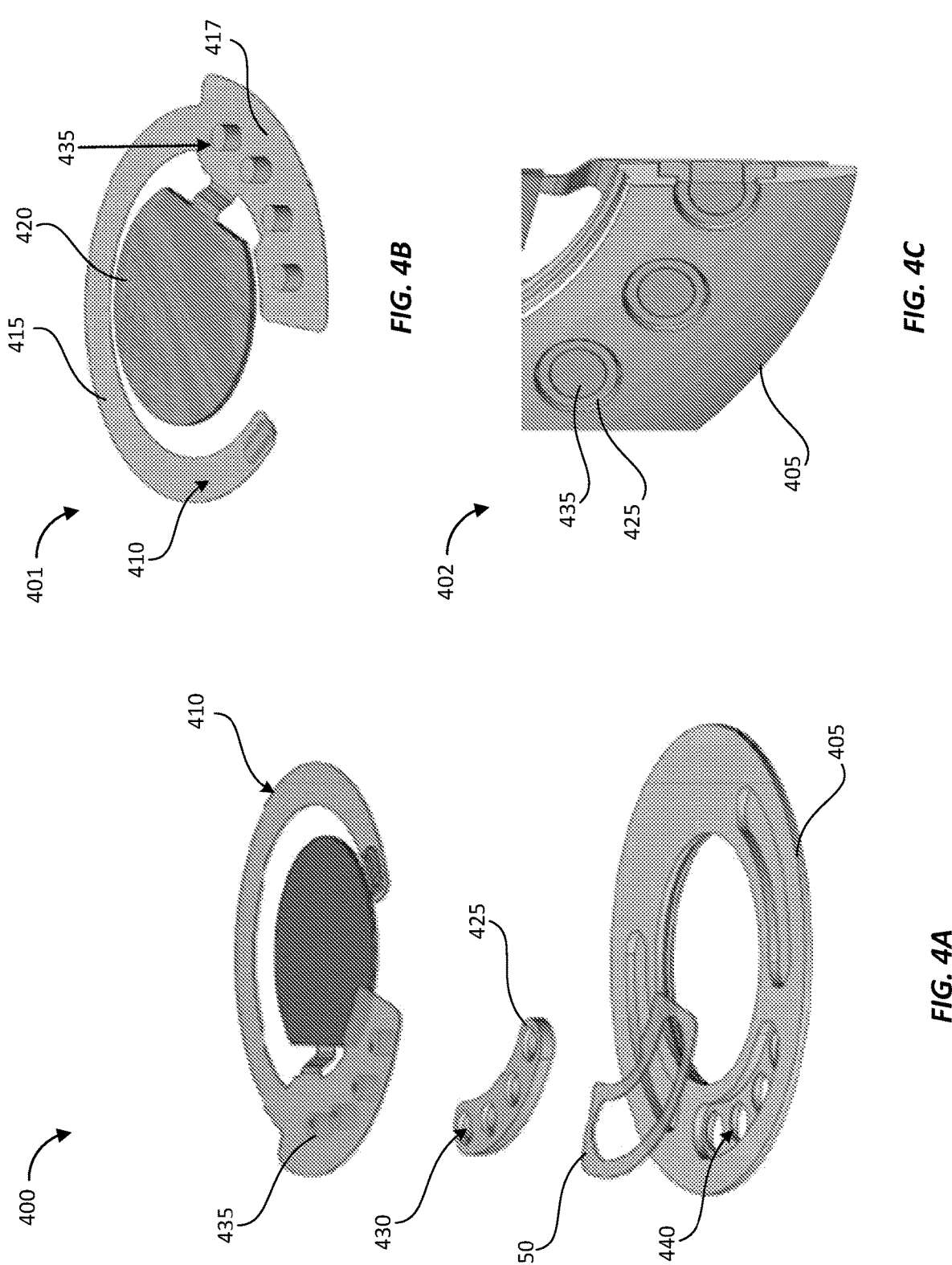
FIGS. 4A-4E show an example charging system having electrical contacts attached as part of an electrical circuitry, according to an embodiment provided herein.
Figure 4D:
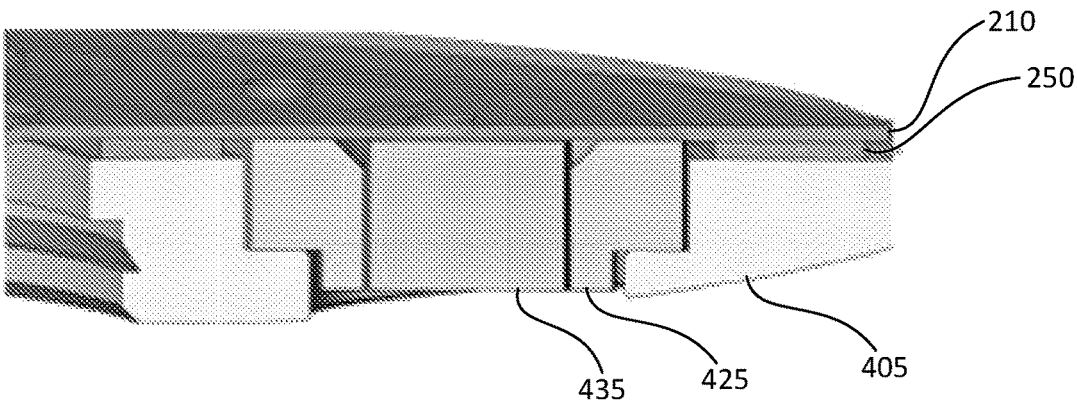
Figure 4E:
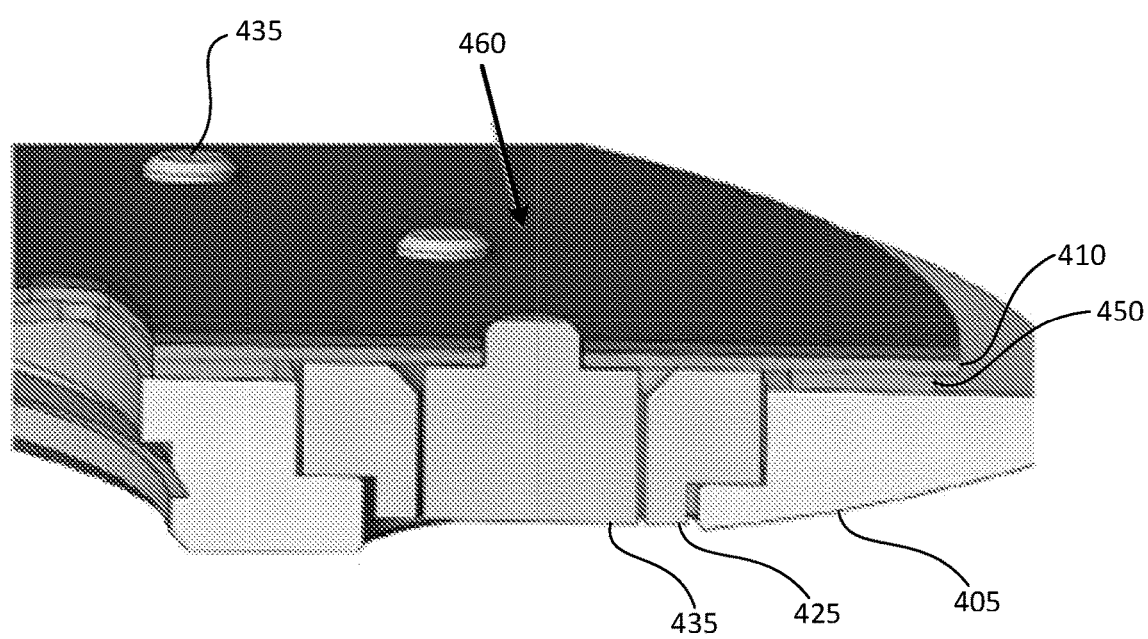

Referring now to FIGS. 4A-4E, an example charging system 400 having electrical contacts 435 formed as part of an electrical circuitry 410 is illustrated. FIG. 4A provides an exploded view of the charging system 400, FIG. 4B provides a view 401 of the electrical circuitry 410, FIG. 4C provides a bottom-up view 402 of the charging system 400 as assembled, FIG. 4D provides a cross-sectional view 403 of the charging system 400 as assembled, and FIG. 4E provides another cross-sectional view 404 of the charging system 400 as assembled.

The charging system 400 may be similar to the charging systems 100, 200, or 300. For example, the charging system 400 may include a housing portion 305 having a depression 440. The depression 440 may be configured to receive an insulator 425. The insulator 425 may include one or more apertures 430 for receiving one or more electrical contacts 435. The charging system 400 may also include an electrical circuitry 410. The electrical circuitry 410 may be the same or similar to the electrical circuitry 110, 210, or 310. For example, the electrical circuitry 410 may include an electrical pathway component 415 and a PCB 420.

In the illustrated embodiment, the electrical contacts 435 may be formed as part of the electrical circuitry 310. With reference to the view 401 of FIG. 4B, the electrical contacts 435 may be formed on a housing-facing side 417 of the electrical circuitry 410. Specifically, the electrical contacts 435 may be formed as part of the electrical pathway component 415. For example, the electrical contacts 435 may be discrete components soldered onto the electrical pathway component 415.

In some embodiments, the ACF 450 may be or include a heat-activated film (HAF). A HAF may be similar to an ACF except that the HAF does not have the conductive properties of the ACF. Instead, the HAF may be used to form a seal using the adhesive properties of the HAF. The HAF may be formed from one or more materials, such as, nitrile phenolic, ethyl vinyl acetate (EVA), or polyurethane.

An advantage to using the HAF in addition to the ACF 350 or in place of the ACF 350 may be an easier assembly process. Since the ACF 350 only conducts electricity in the direction of its thickness (e.g., the z-direction), using the ACF 350 may require electrical components to be assembled along the z-direction. For example, as illustrated by FIG. 1, the electrical contacts 135 vertically align along the z-axis with the electrical circuitry 110. Thus, the ACF 150 is positioned between the electrical contacts 135 and the electrical circuitry 110 to provide electrical conduction along the z-axis. In the embodiments where the charging system 400 has or requires a different arrangement of electrical components such that the electrical components do not align in a single direction (e.g., along the z-axis), then it may be advantageous to use the HAF to form the seal between the housing portion 405 and the electrical circuitry 410. Various embodiments using the ACF and a HAF are discussed in greater detail below with respect to FIGS. 6A and 6B.

HAFs and ACFs may be advantageous over conventional sealing methods (e.g., injection molding or liquid adhesives) because they can provide a stronger, more complete seal between the electrical circuitry 410 and the housing portion 405. For example, HAFs and ACFs, such as the ACF 450, can form stronger bonds with one or both of the electrical circuitry 410 and the housing portion 405 over conventional sealing methods. HAFs can have peels strengths of >2× compared to non-heat activated pressure sensitive adhesives.

In some embodiments, the charging system 400 may include a stiffener 460. As illustrated by the view 404 of FIG. 4E, a stiffener 460 may be disposed on and in contact with the electrical circuitry 410. Specifically, the stiffener 460 may be disposed and in contact with a surface of the electrical circuitry 410 opposite the ACF 450. In other words, the ACF 450 may contact a first surface of the electrical circuitry 410 and the stiffener 460 may be disposed on and in contact with a second surface of the electrical circuitry 410, where the first surface and the second surface of the electrical circuitry 410 are opposite one another.

The stiffener 460 may be added to the charging system 400 to prevent flex of movement of the electrical circuitry 410 or other components housed within the housing portion 405, and to provide a rigid planar surface for the HAF/ACF to adhere to. For example, the stiffener 460 may be or include a rigid non-conducting material, such as plastic (e.g., polycarbonate) or a PCBV material (e.g., FR-4), or a metal such as aluminum or stainless steel.

The stiffener 460 may include one or more apertures (not labeled) through which a portion of the one or more electrical contacts 435 can be inserted. As illustrated, a portion of the electrical contacts 435 may be exposed through the stiffener 460 via the one or more apertures. Exposing electrical contacts 435 through the stiffener can allow the electrical contacts 435 to contact electronics, such as another PCB, that may be positioned on the stiffener 460, to provide easier access for soldering, or to provide locational alignment.

Figure 5:
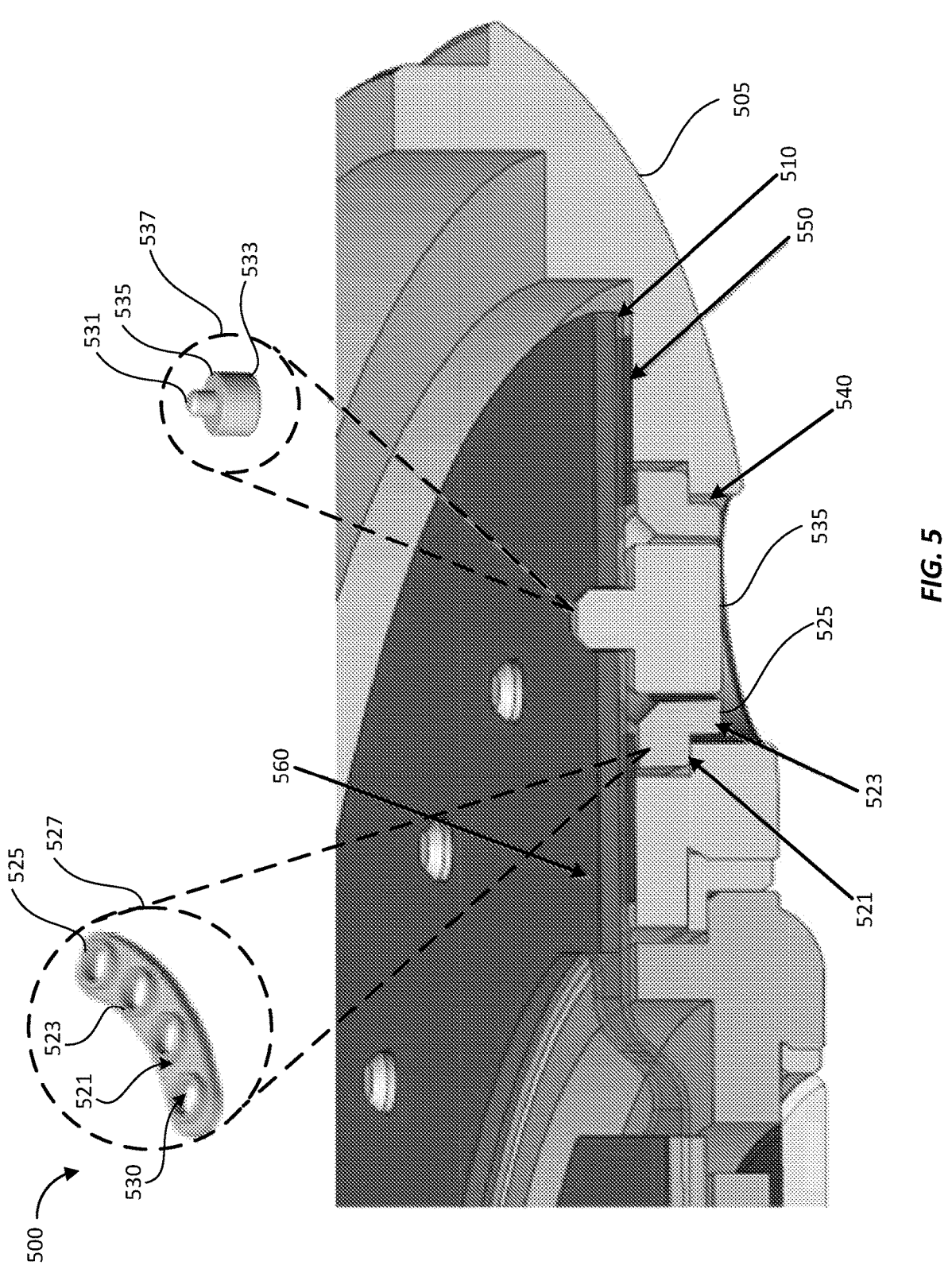
FIG. 5 shows another example charging system including a stiffener, according to an embodiment provided herein.

Referring now to FIG. 5, another example charging system 500 including a stiffener 560 is provided. As illustrated, the charging system 500 may be the same or similar to the charging systems 100-400, including having an electrical circuitry 510 and a housing portion 505. FIG. 5 illustrates the charging system 500 in an assembled view.

As illustrated, an insulator 525 may be inserted into a depression 540 formed by the housing portion 505. Callout 527 provides a close-up view of the insulator 525. As illustrated, the insulator 525 may include one or more apertures 530. In this example, a lip 523 may be formed around each of the one or more apertures 530. The lip 523 may be raised from a surface 521 of the insulator 525. As can be seen, when assembled, the lip 523 and the surface 521 may contour to fit the shape of the depression 540. Forming the insulator 525 to have the lip 523 extend from the surface 521 may be advantageous to hold the insulator 525, and thus the electrical contacts 535, in place. Moreover, the lip 523 may form another barrier (e.g., a compression seal) against ingress of external materials.

The one or more electrical contacts 535 may be inserted into the apertures 530. Callout 537 provides a close-up view of one of the electrical contacts 535. As illustrated, the electrical contacts 535 may be configured to have a top portion 531 and a bottom portion 533. The top portion 531 may be smaller in volume and footprint than the bottom portion 533. In some embodiments, the top portion 531 may be a pin and the bottom portion 533 may be the base of the pin. The bottom portion 533 and the top portion 531 may be formed from a single block of material, such as for example, via a machining process.

The top portion 531 of the charging contact 535 may be formed to extend through an aperture (not labeled) of the stiffener 560 such that a portion of the top portion 531 is exposed on an opposing side of the stiffener 560. In other words, the bottom portion 533 of the charging contact 535 may be disposed on a first side of the stiffener 560 and the top portion 531 may extend through the stiffener 560 such that a portion of the top portion 531 is exposed on a second, opposing side of the stiffener 560. As noted above, exposing the top portion 531 of the electrical contacts 535 can allow for an electrical pathway to be formed by the electrical contacts 535 to an electrical component that may be positioned on the second side of the stiffener 560, or to facilitate access for soldering.

The charging system 500 may include an ACF 550. As illustrated, the ACF 550 may have a footprint such to be disposed and in contact with the insulator 525, the electrical circuitry 510, and the housing portion 505. In this manner, the ACF 550 can provide a seal between the insulator 525, the electrical circuitry 510, and the housing portion 505.

Figures 6A, 6B:
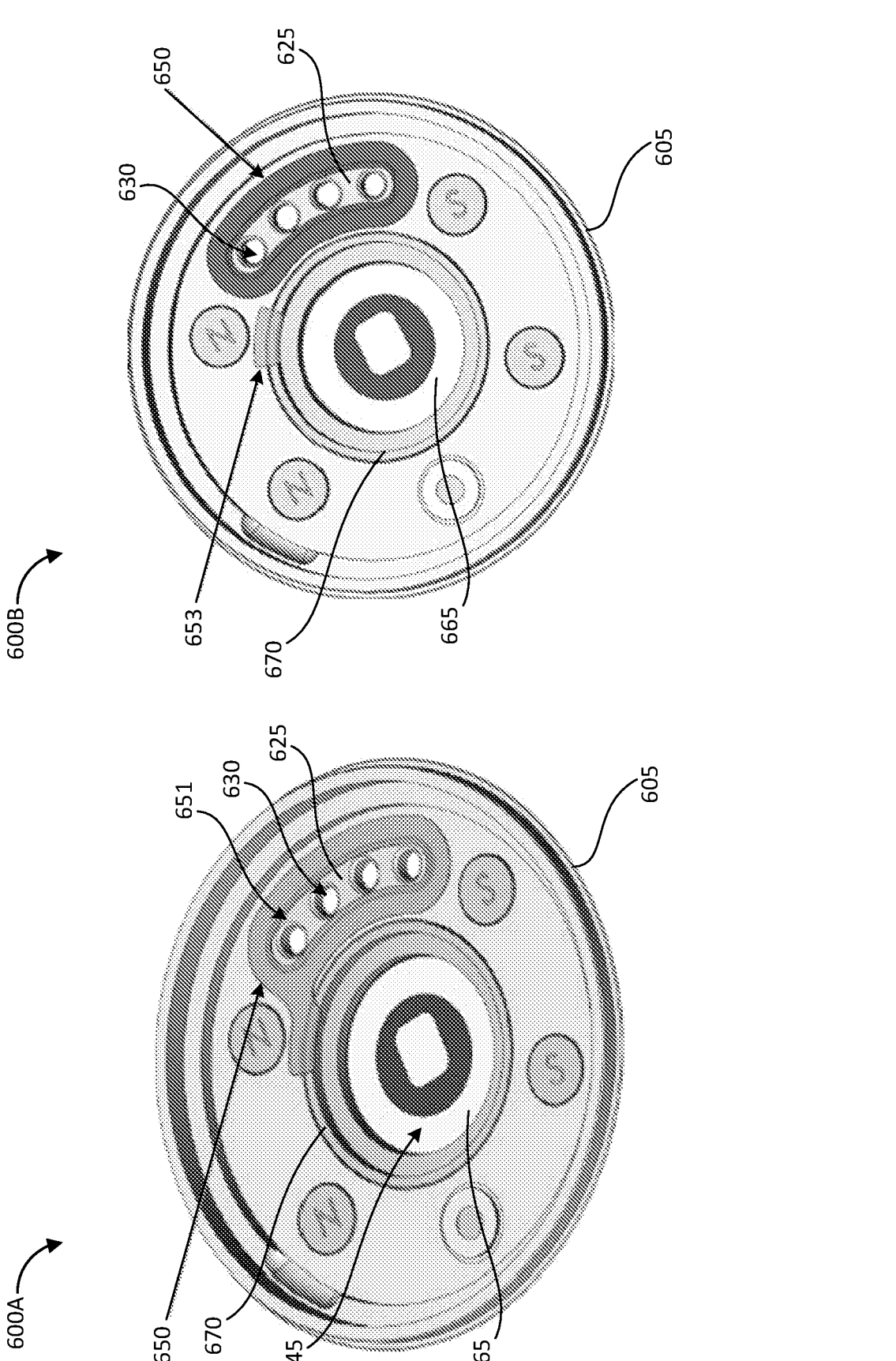
FIGS. 6A and 6B show example charging systems providing various arrangements of an anisotropic conductive film and/or heat activated film, according to an embodiment herein.

Referring now to FIGS. 6A and 6B, example charging systems 600A and 600B providing various arrangements of an ACF 650 are provided. The charging systems 600A and 600B may be the same or similar to the charging systems 100-500. For example, although not illustrated, the charging systems 600A and 600B may include electrical circuitry, similar to the electrical circuitry 110-510, and one or more electrical contacts, similar to the electrical contacts 135-535.

As illustrated, the charging systems 600A and 600B may include a housing portion 605. The housing portion 605 may include an opening 645. A sensor 665 may be inserted or otherwise disposed within the opening 645. Example sensors 665 may include an EKG sensor, a PPG sensor, a heart monitor sensor, or any other sensor that may require an electrical connection with the charging systems 600A and 600B while maintaining contact with an external environment (e.g., a user's wrist).

To provide an electrical pathway from the user's skin to the sensor 665, the sensor 665 may include one or more electrodes 670. To provide an electrical pathway between the electrodes 670 and the electrical circuitry (not shown), an ACF may be applied such to contact both the electrode 670 and the electrical circuitry.

FIG. 6A illustrates a first arrangement in which a single ACF 650 component is configured to provide a seal around an insulator 625 while also contacting the electrode 670, thereby providing an electrical pathway between the electrode 670 and the electrical circuitry. In some embodiments, the ACF 650 may not have an opening 651, as illustrated, and instead extend over electrical contacts (not shown) when inserted into the apertures 630 of the insulator 625. Because the ACF 650 only allows for electrical conduction in its thickness direction (e.g., a z-direction), the electrode 670 and the electrical contacts can maintain electrical isolation despite using the same ACF 650 as an electrical pathway to the electrical circuitry.

FIG. 6B illustrates a second arrangement in which two ACFs are used. A first ACF 650 may be used to form a seal around the insulator, and in some cases, provide an electrical pathway between the electrical contacts, when inserted into the apertures 630 of the insulator 625, and the electrical circuitry. A second ACF 653 may be used to form an electrical pathway between the electrode 670 and the electrical circuitry. In some embodiments, one or both of the first ACF 650 and the second ACF 653 may be or include an HAF. For example, the first ACF 650 may be an HAF instead of an ACF, and the second ACF 653 may be an ACF. In such an example, the first ACF 650 may be used for sealing purposes around the electrical contacts and the second ACF 653 may be used to provide an electrical pathway between the electrode 670 and the electrical circuitry.

As can be appreciated, the configuration and arrangement of the ACF 650 (e.g., having more than one ACF 650) may depend on the arrangement of components within the charging systems 600A and 600B and the need to form electrical pathways while maintaining electrical isolation from other components (e.g., the electrical contacts). For example, if the sensor 665 include two electrodes 670 requiring electrical isolation from each other, as well as the electrical contacts, then the ACF 650 could be formed as a single component to cover both electrodes and the electrical contacts, could be formed as two components to cover both electrodes and the electrical contacts, or could be formed as three components to individually cover the electrodes and electrical contacts. Because the ACF 650 only provides an electrical conduction in its thickness direction, various configurations of the ACF 650 are contemplated herein depending on the arrangement of components of the charging device and electrical needs of the charging device, including any sensors.

Referring now to FIG. 7, FIG. 7 shows an example method 700 of sealing wearable or implantable electronic devices. The example method 700 will be discussed with respect to the example charging systems 100 shown in FIGS. 1A-C, the charging system 200 shown in FIGS. 2A-D, the charging system 300 shown in FIGS. 3A-E, and the charging systems 600A and 600B shown in FIGS. 6A-6B; however, example methods according to this disclosure may be employed with respect to any suitable devices according to this disclosure.

At block 710, a housing portion 105 is obtained and provided for the assembly process. In this example, the housing portion 105 has a circular shape and may be configured to fit together with a top housing portion (not shown) to form a housing having a circular disc shape. However, it should be appreciated that any suitable housing shape may be employed, such as for example a square or rectangular shape. Further, the device housing may be composed of multiple different components. For example, as can be seen in FIG. 1B, the housing portion 105 may be a generally circular plate having an opening 145 therein. The opening 145 may be configured to receive one or more sensors, such as the sensor 665 from FIGS. 6A and 6B, or other components, such as a speaker or one or more light emitters, such as one or more light emitting diodes ("LEDs"). The housing portion 105 may also include a depression 140 for receiving an insulator 125.

At block 720, the insulator 125 may be obtained and provided for the assembly process. The insulator 125 may be formed from a single block of material or may be multiple individual discrete insulators. For example, the insulator 125 may be formed via an injection molding process or machining. In some embodiments, the insulator 125 may include a lip, such as the lip 523, described above with respect to FIG. 5. The configuration of the insulator 125 may depend on the configuration of the depression 140 of the housing portion 105.

At block 730, one or more electrical contacts 135 may be obtained and provided for the assembly process. The one or more electrical contacts 135 may be electrically conductive such to provide an electrical pathway between an external charging device and the electrical circuitry 110, and thus a battery stored within the device. In some embodiments, the one or more electrical contacts 135 may be discrete components from one another, while in other embodiments, the electrical contacts 135 may be formed from the same component, such as the charging component 255 described above with reference to FIGS. 2A-2D. For example, the charging component 255 may be a PCB or a flex circuit. The electrical contacts 235 may be formed as part of the charging component 255.

In other embodiments, the electrical contacts 135 may be formed as part of the electrical circuitry 110. For example, as illustrated by FIGS. 3A-3E, the charging component 355, having the electrical contacts 335 formed therein, may be formed as part of the electrical circuitry 310. In other embodiments, as illustrated by FIGS. 4A-4E, the electrical contacts 435 may be formed directly as part of the electrical circuitry 410 without the charging component 355. In such an example, the electrical contacts 435 may be formed as part of or attached to the electrical circuitry 410 via a soldering process.

At block 740, an ACF 150 may be obtained and provided for the assembly process. The ACF 150 may be formed from a material that allows for anisotropic conduction of electricity. Additionally, the ACF 150 may have one or more adhesive properties. In some embodiments, the ACF 150 may include an opening, such as the opening 351 of the ACF 350. The footprint of the ACF 150 may depend on the application, configuration of the components with the charging system 100, and the sealing/conduction requirements of the ACF 150. For example, if the ACF 150 is provided to create an electrical pathway between the electrical contacts 135 and the electrical circuitry 110, then the ACF 150 may not include the opening 351. However, if the ACF 150 is provided to create a seal between the housing portion 105 and the electrical circuitry 110, then the ACF 150 may include the opening 351.

In some embodiments, the ACF 150 may have an extended footprint such to create an electrical pathway between one or more electrodes of a sensor and the electrical circuitry 110. Instead of an extended footprint, the ACF 150 may include more than one ACF component. For example, the charging system 100 may include a first ACF 650 and a second ACF 653. The number of ACFs 150 and arrangement of the footprint of the ACF 150 may depend on the configuration of components within the charging system 100, the conduction requirements of the components therein, and the adhesive requirements for the assembly process.

In some embodiments, the charging system 100 may include an HAF in place of the ACF 150 or in addition to the ACF 150. For example, following the above example, the first ACF 650 may be an HAF instead of an ACF and the second ACF 653 may be an ACF. The HAF may be used in place of the first ACF 650 if the ACF 650 is applied for adhesive purposes and not to provide electrical conduction. In contrast, the ACF 653 may require electrical conduction, and thus an ACF may be used instead of a HAF.

At block 750, a seal may be formed using the ACF 150. For example, a seal may be formed by performing one or more sealing processes on the ACF 150. In some embodiments, a heat-application process may be performed on the ACF 150 to generate the seal. The heat-application process may include exposing the ACF 150 to an increased temperature ranging from 60-200° C. The ACF 150 may be exposed to the increased temperature for a duration of time, for example, less than a minute to a few minutes (e.g., ranging from 30 seconds to 5 minutes).

In other embodiments, instead of or in addition to exposing the ACF 150 to an increased temperature, the ACF 150 may be exposed to an increased pressure. For example, the increased pressure may range from 10-30 PSI for 10-60 seconds. In still another embodiment, a sealing process may include a curing process, such as a UV curing process or heat curing process without pressure.

Upon application of the one or more sealing processes, a seal may be formed by the ACF 150. As discussed above, the seal may be formed between various components of the charging system 100, depending on the footprint and arrangement of the ACF 150. For example, the seal may be formed between the housing portion 105 and the electrical circuitry 110, between the housing portion 105, the insulator 125, and the electrical circuitry 110, and in some embodiments, the housing portion 105, the electrical circuitry 110, the insulator 125, and the one or more contacts 135.

At block 760 an electrical circuitry 110 may be obtained and provided for the assembly process. The electrical circuitry 110 may include an electrical pathway component 115 and a printed circuit board (PCB) 120. As described above, in some examples, the one or more electrical contacts 135 may be formed as part of the electrical circuitry 110. The electrical circuitry 110 may be positioned such to be aligned with the housing portion 105 and be in contact with the one or more electrical contacts 135.

In some embodiments, the method 700 may also include obtaining and providing a stiffener 560 for the assembly process. In such embodiments, the stiffener 560 may be positioned such to be in contact with and aligned with the electrical circuitry 110. As described above, the stiffener 560 may be positioned on a surface of the electrical circuitry 110 opposite the housing portion 105. Additionally, the stiffener 560 may include one or more apertures through which a portion of the one or more electrical contacts 135 may be exposed there through.

It should be appreciated that the ordering of the blocks in the example method 700 above are not required and other orders may be employed. For example, blocks 720-740 may be performed in a different order, such that the ACF 150 may be applied to the housing portion 105 prior (block 740) prior to providing and inserting the insulator 125 into the depression 140 of the housing portion 105 (block 720). Then the one or more electrical contacts 135 may be provided and inserted into the insulator 125 (block 730). Embodiments where the one or more electrical contacts 135 are formed as part of the electrical circuitry 110 may follow this sequence of steps during an assembly process.

In another example of differing step sequence, performing one or more sealing processes (block 750) may be performed after the electrical circuitry 110 is provided and assembled such to contact the electrical contacts 135 (block 760). In some embodiments, performing the one or more sealing processes (block 750) may be performed after another housing portion (not illustrated) is provided and fitted with the housing portion 105 to form the wearable or implantable device.

Further, it should be appreciated that this example method 700 may not be sufficient to entirely assemble the charging system 100 or the device. Still other steps may be employed, such as to affix a cover plate, e.g., with a logo or product name, to the housing or to insert other components within the housing before it is sealed.

Figure 8:
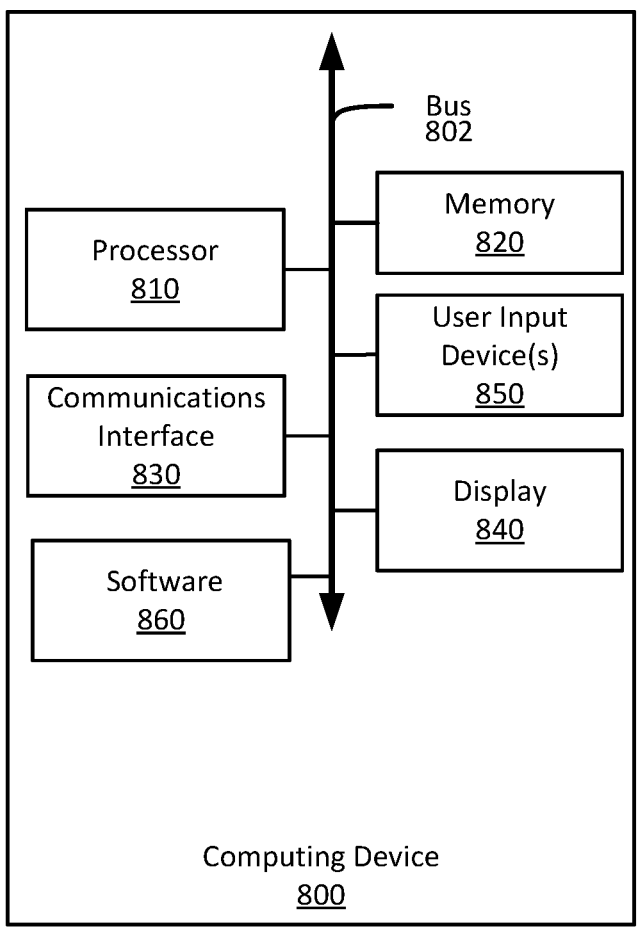
FIG. 8 shows an example computing device suitable for charging a wearable device.

Referring now to FIG. 8, FIG. 8 shows an example computing device 800 suitable for use in example systems or methods according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for charging or executing any software 860 present on the device. The computing device, in this example, also includes one or more user input devices 850, such as a keyboard, mouse, touchscreen, microphone, buttons, etc., to accept user input. The computing device 800 also includes a display 840 to provide visual output to a user.

The computing device 800 also includes a communications interface 830. In some examples, the communications interface 830 may enable communications using one or more communication techniques, such as BT or BLE, or using one or more communication networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A device comprising:
a first housing portion defining a depression having one or more openings providing access from an external environment to an interior of the first housing portion;
an insulator disposed within the depression and comprising one or more apertures, each aperture corresponding to a different one of the one or more openings;
one or more electrical contacts positioned to provide an electrical pathway between an external surface of the first housing portion and an interior surface of the first housing portion via a respective one of the one or more openings, wherein the insulator electrically isolates the one or more electrical contacts from the first housing portion and from each other and wherein the one or more electrical contacts are each positioned within a respective aperture of the insulator and extending through the corresponding opening of the one or more openings; and
an anisotropic conductive film (ACF), wherein the ACF is positioned over the one or more electrical contacts to seal the one or more apertures and the one or more openings to prevent ingress of contaminants.

2. The device of claim 1, wherein the ACF provides an electrical pathway between the one or more electrical contacts and one or more electrical contacts of a printed circuit board.

3. The device of claim 1, wherein the insulator comprises a single molded block of rigid plastic or multiple discrete insulators.

4. The device of claim 1, further comprising a printed circuit board having electrical circuitry to charge a battery, the printed circuit board comprising one or more electrical contacts in electrical communication with the electrical circuitry and one or more of the electrical contacts.

5. The device of claim 1, wherein the one or more electrical contacts comprise a plurality of electrical contacts and the one or more apertures comprise a plurality of apertures, wherein each of the plurality of apertures is configured to receive a respective electrical contact from the plurality of electrical contacts.

6. The device of claim 5, wherein the plurality of electrical contacts comprises gold-plated contacts.

7. The device of claim 1, wherein the one or more electrical contacts comprise printed circuit board contacts.

8. The device of claim 1, wherein the one or more electrical contacts are formed as part of electrical circuitry.

9. The device of claim 1, wherein the device further comprises a heat activated film, wherein the heat activated film is positioned over and in contact with the insulator to form a seal between the insulator and the first housing portion.

10. The device of claim 1, wherein the device further comprises an electrical circuitry configured to electrically couple to a battery housed within the first housing portion with an external charging device.

11. The device of claim 1, wherein:

the device further comprises a printed circuit board ("PCB"), a processor disposed on the PCB, and a sensor having an electrode; and wherein the electrode comprises at least one of the one or more electrical contacts, and the ACF is positioned over and in contact with the electrode of the sensor on a first side of the ACF and in contact with electrical circuitry corresponding one or more PCB electrical contacts on the PCB on a second side of the ACF, wherein the first side and the second side are approximately opposing, and the ACF electrically couples the electrode to the one or more PCB electrical contacts electrical circuitry.

12. The device of claim 1, wherein the device further comprises a stiffener disposed within the housing over the insulator and the electrical contacts.

13. A method of sealing a wearable device, the method comprising:

providing a first housing portion defining a depression having one or more openings providing access from an external environment to an interior of the first housing portion;

disposing an insulator having one or more apertures formed therein into the depression of the first housing portion, wherein the depression is configured to receive the insulator, each aperture corresponding to a different one of the one or more openings;

disposing one or more electrical contacts into the one or more apertures of the insulator, wherein the one or more apertures are configured to receive the one or more electrical contacts such that at least a portion of each of the one or more electrical contacts is exposed to an external environment via the corresponding one of the one or more openings of the depression, and wherein the insulator electrically isolates the one or more electrical contacts from the first housing portion and from each other;

disposing an anisotropic conductive film (ACF) onto the first housing portion, wherein the ACF is configured to be electrically conductive along a thickness of the ACF;

generating a seal using the ACF; and disposing an electrical circuitry to align with and be in contact with at least a portion of each of the electrical contacts, wherein the seal formed by the ACF is between the first housing portion and the electrical circuitry.

14. The method of claim 13, wherein generating the seal using the ACF comprises performing one or more sealing processes to the ACF to create the seal.

15. The method of claim 14, wherein the one or more sealing processes comprises at least one of:

a heat-application process;

a pressure-application process; or a curing process.

16. The method of claim 15, wherein:

the one or more sealing processes is a heat-application process;

the method further comprises performing the heat-application process; and performing the heat-application process comprises applying an increased temperature to the ACF for at least 10 seconds.

17. The method of claim 13, wherein the first housing portion comprises a central opening, and the method further comprises:

inserting a sensor having an electrode into the central opening of the first housing portion; and applying the ACF onto the electrode to be in contact with at least a portion of the electrode, wherein the ACF provides an electrical pathway between the electrode and the electrical circuitry.

18. The method of claim 17, wherein:

the ACF comprises a first ACF and a second ACF;

the first ACF forms a seal between the first housing portion and the electrical circuitry; and the second ACF provides the electrical pathway between the electrode and the electrical circuitry.

19. The method of claim 15, wherein:

disposing the ACF onto the first housing portion further comprises disposing the ACF to be in contact with the insulator; and generating the seal using the ACF further comprises forming a seal between the insulator and the electrical circuitry.

20. The method of claim 15, the method further comprising:

forming the one or more electrical contacts as part of the electrical circuitry.

* * * * *